(12) United States Patent
Lucamarini et al.

(10) Patent No.: US 10,095,661 B2
(45) Date of Patent: Oct. 9, 2018

(54) STRING PROCESSOR

(71) Applicant: Kabushiki Kaisha Toshiba, Minato-ku (JP)

(72) Inventors: Marco Lucamarini, Cambridge (GB); Alan Plews, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 345 days.

(21) Appl. No.: 14/818,464

(22) Filed: Aug. 5, 2015

(65) Prior Publication Data

US 2016/0087796 A1 Mar. 24, 2016

(30) Foreign Application Priority Data

Sep. 22, 2014 (GB) .................. 1416735.7

(51) Int. Cl.
*G06F 17/18* (2006.01)
*H04L 9/08* (2006.01)
*G06F 7/58* (2006.01)

(52) U.S. Cl.
CPC ............ *G06F 17/18* (2013.01); *H04L 9/0858* (2013.01); *G06F 7/58* (2013.01)

(58) Field of Classification Search
CPC ... G06F 7/58; G06F 7/76; G06F 17/18; H04L 9/06; H04L 9/0852
See application file for complete search history.

(56) References Cited

U.S. PATENT DOCUMENTS

| | | | |
|---|---|---|---|
| 3,961,169 A | 6/1976 | Bishop et al. | |
| 6,430,586 B1 | 8/2002 | Williams | |
| 8,768,992 B2 * | 7/2014 | Tapster | G06F 7/588 |
| | | | 708/250 |

FOREIGN PATENT DOCUMENTS

| | | |
|---|---|---|
| DE | 101 54 532 A1 | 5/2003 |
| JP | 8-305551 A | 11/1996 |

(Continued)

OTHER PUBLICATIONS

Office Action dated Sep. 13, 2016 in Japanese Patent Application No. 2015-161934 (submitting English translation only).

(Continued)

*Primary Examiner* — Hadi S Armouche
*Assistant Examiner* — Paul E Callahan
(74) *Attorney, Agent, or Firm* — Oblon, McClelland, Maier & Neustadt, L.L.P.

(57) ABSTRACT

According to one embodiment is a string processor configured to output a biased output string having a first output value and a second output value. The string processor is given an unbiased input string of at least two input values. The string processor has a processing unit and a memory device, the memory device stores a code-word set. The code-word set has a plurality of code-words, each code-word having at least one input value, and each output value has at least one corresponding code-word. The processing unit is configured to: compare a comparison string to the code-word set, wherein the comparison string includes an input from the input string; and assign an output value to the output string when the comparison string matches a code-word. The assigned output value is that to which the matched code-word corresponds. An output probability of an output value is defined by the number and length of the code-words corresponding to that output value; and the output probability of the first output value is larger than the output probability of the second output value.

14 Claims, 12 Drawing Sheets

(56) References Cited

FOREIGN PATENT DOCUMENTS

| JP | 2003-131566 A | 5/2003 |
| JP | 2013-255263 A | 12/2013 |

OTHER PUBLICATIONS

British Search and Examination Report dated Apr. 2, 2015 in British Application 1416735.7, filed on Sep. 22, 2014.
John Von Neumann "Various Techniques Used in Connection with Random Digits", NBS Appl. Math. Series, vol. 12, Jan. 1951, 3 pages.
David A Huffman "A Method for the Construction of Minimum-Redundancy Codes", Proceedings of the I.R.E., Sep. 1952, 4 pages.
Charles H. Bennett et al. "Quantum Cryptography: Public Key Distribution and Coin Tossing", Proceedings of the IEEE International Conference on Computers, Systems and Signal Processing, Dec. 10-12, 1984, 5 pages.
Hoi-Kwong Lo et al. "Efficient Quanum Key Distribution Scheme and Proof of Its Unconditional Security", arXiv quant-ph/0011056, Feb. 1, 2005, 46 pages.
Won-Young Hwang "Quantum Key Distribution with High Loss: Toward Global Secure Communication", Physical Review Letters, vol. 91, No. 5, Aug. 1, 2003, 4 pages.
M. Lucamarini et al. "Efficient Decoy-State Quantum Key Distribution with Quantified Security", Optics Express, vol. 21, No. 21, Oct. 21, 2013, 16 pages.
Andrew Rukhin et al. "A Statistical Test Suite for Random and Pseudorandom Number Generators for Cryptographic Applications", National Institute of Standards and Technology, Special Publication 800-22, Revision 1a, Apr. 2010, 121 pages.
Daniela Frauchiger et al. "True Randomness from Realistic Quantum Devices", arXiv:1311.4547v1, 2013, 20 pages.
Yun Zhi Law et al. "Quantum Randomness Extraction for Various Levels of Characterization of the Devices", Journal of Physics A: Mathematical and Theoretical, vol. 47, No. 42, Oct. 16, 2014, 12 pages.

\* cited by examiner

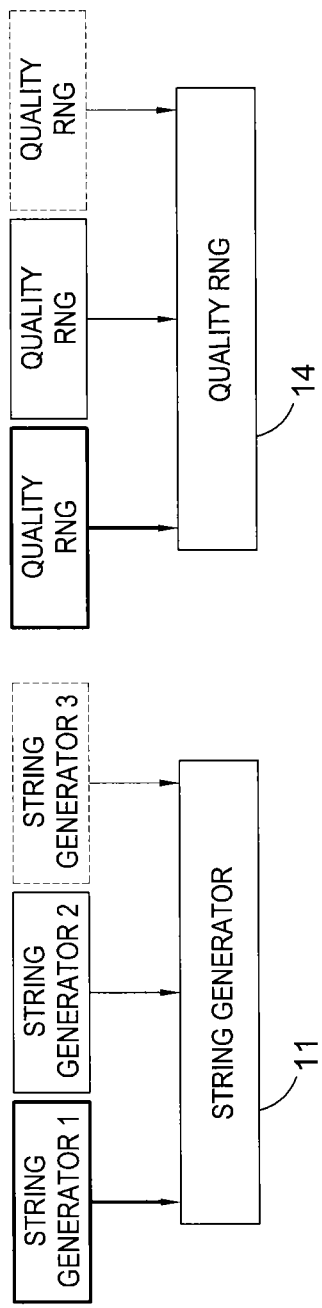

STRING PROCESSOR

FIELD

Embodiments described herein relate generally to string processors and methods of processing strings of variables.

BACKGROUND

Modelling, simulation and cryptography tools often require strings of random values or bits. For example, strings of random bits are often required for generating data encryption keys, simulating random processes, modelling complex natural phenomena. These strings of random bits may need to be unbiased, meaning every output value has the same chance of occurring (e.g. there is an equal chance of each output bit being a "1" or a "0"), or biased, meaning that the output values do not have the same chance of occurring (e.g. on average there will be twice as many "1"s as "0"s). As such, one specific example of an implementation of an embodiment may be the processing of random strings of values.

Computers, being deterministic systems, are not inherently suitable for producing strings of random values or bits. There are two main approaches to doing so: Pseudo-Random Number Generators (PRNGs) and True Random Number Generators (TRNGs).

TRNGs derive their 'randomness' from physical phenomena. Generally, TRNGs will do this by using measurements from a random natural occurrence to produce a string of random values or bits derived from the measured values. Typical examples of measured phenomena include atmospheric noise, radioactive decay and transmission of photons through a half-silvered mirror. As the outputs are determined by a natural process, which is inherently random, the output is truly random.

PRNGs are computer implemented algorithms, mathematical formulae or other methods which create a string of values or bits which may, to a certain extent, appear random. Examples of PRNG algorithms which output seemingly random strings of values include linear congruential generators, lagged Fibonacci generators, linear feedback shift registers and algorithms based on computational hardness assumptions.

PRNGs—frequently being computer implemented algorithms—are generally more efficient and can have a higher bitrate than TRNGs and so are often used in many applications where large strings of values or bits are required.

However, although such PRNGs may produce outputs which appear random, all PRNGs are, by their very definition, not truly random.

Biased strings of random bits are used in several cryptography techniques, for example in Quantum Key Distribution (QKD). QKD allows two parties to create and share a random secret key, or cipher, in a secure manner using quantum bits, or qubits. QKD theoretically allows the sender (often referred to as "Alice") and receiver (often referred to as "Bob") of the key to tell if an eavesdropper (often referred to as "Eve") has intercepted the communication, compromising the key's security. This relies on the fact that a qubit cannot be measured without affecting the measured property. As such, any such alteration of the received qubits due to Eve's interference can be detected by Alice and Bob.

One method of implementing a QKD technique is the BB84 protocol. In order to effectively use some implementations of the BB84 protocol—in particular that using a decoy state protocol—a biased string of random bits or variables is required to select the frequency of pulses of certain intensities. Further possible applications for biased strings of random variables include modelling rare events, e.g. rain in the desert; simulating a card game on a computer; and modelling a random walk type problem, e.g. quantum scattering. These examples, along with other uses in the fields of cryptography, forecasting, gaming and research, require a string of values or bits with the following properties:

(a) the string of bits must meet a certain assessable quality of randomness;
(b) the string of bits must be statistically indistinguishable from a comparable (e.g. same value/bit rate and bias) string of values or bits generated by a TRNG; and
(c) the occurrence frequency (i.e. the bias) of the bits in the output must approximate that selected by a user.

An additional efficiency optimisation requirement can also be taken into consideration, which is that:

(d) the generation of each bit in the output string must use on average a number of bits from the input string close to the entropy of the output string.

Embodiments described herein can satisfy requirements (a) to (c), as well as the optimisation requirement (d).

BRIEF DESCRIPTION OF THE DRAWINGS

FIG. 4A schematically illustrates multiple string generators;

FIG. 4B schematically illustrates multiple high-quality RNGs;

DETAILED DESCRIPTION

Figure 1:
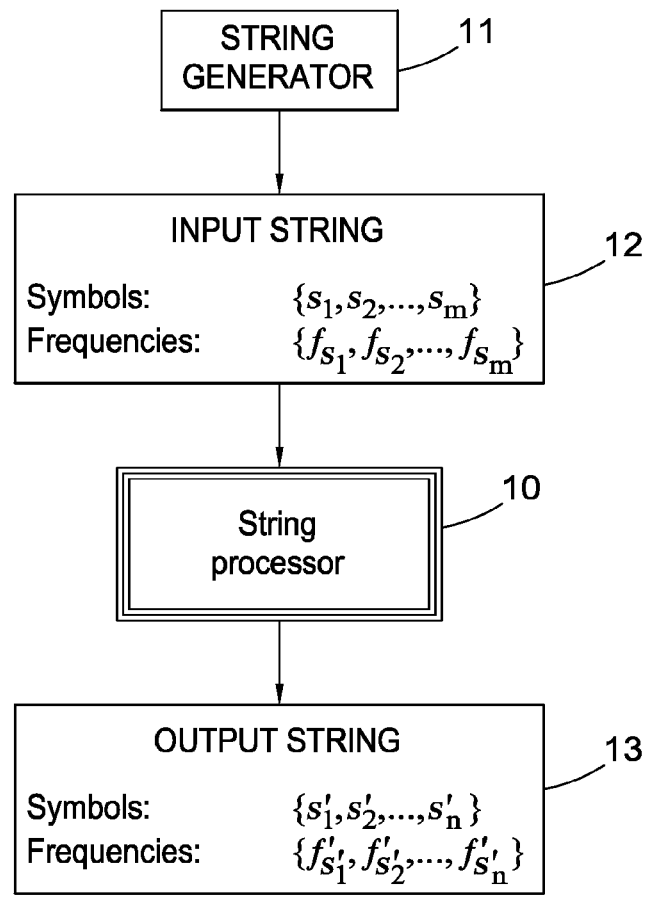
FIG. 1 schematically illustrates an embodiment as a string processor with an input and output string.

According to an embodiment is a string processor configured to output a biased output string comprising a first output value and a second output value given an unbiased input string of at least two input values, the string processor comprising a processing unit and a memory device, the memory device storing a code-word set, wherein the code-word set comprises a plurality of code-words, each code-word comprising at least one input value, wherein each output value has at least one corresponding code-word; the processing unit being configured to: compare a comparison string to the code-word set, wherein the comparison string comprises an input from the input string; and assign an output value to the output string when the comparison string matches a code-word, wherein the assigned output value is that to which the matched code-word corresponds; wherein an output probability of an output value is defined by the number and length of the code-words corresponding to that output value; and the output probability of the first output value is larger than the output probability of the second output value.

In the present disclosure, the terms "input" and "output" are used to describe a specific symbol or string of symbols, usually—but not always—a bit or string of bits, which has been input into or output from the string processor, RNG or other device. The term "value", as used herein, describes the different bits, strings of bits, symbols or strings of symbols which may belong to an input or make up an output, once selected. For example, an embodiment described herein may have two possible input values, $s_1$ and $s_2$, indicated with non-primed quantities, and three possible output values, $s'_1$, $s'_2$ and $s'_3$, indicated with primed quantities. Once one of these values is selected, it becomes a specific input or output, thus composing the input or output string, indicated, e.g., as $i_1 i_2 i_3 i_4 i_5 i_6 \ldots$ and $o_1 o_2 o_3 o_4 o_5 o_6 \ldots$, respectively. Each symbol $i_x$ in the input string is assigned with one of the input values $s_j$. Similarly, each symbol $o_x$ in the output string is assigned with one of the output values $s'_j$.

One characteristic of string processors, and in particular RNGs, is the bias. The bias of an output string is the ratio of the average number of occurrences of one value compared to another. For example, if a string processor outputs on average 1 $s'_1$ for every 15 $s'_2$, the bias of $s'_1:s'_2$ is 1:15. The occurrence probability, or occurrence frequency (the two terms being used largely interchangeably herein), of $s'_1$ is $1/16$ and of $s'_2$ is $15/16$. When the occurrence probability of each value is equal (i.e. when all values are equally likely to be the next input or output), the system is said to be unbiased, e.g. flipping a fair coin.

According to some embodiments is a string processor configured to output a biased string of values given an unbiased string of input values, wherein the string processor may: compare part of the input string to a code-word set; and output an output value when the compared part of the input string matches a code-word in the code-word set.

A string processor according to an embodiment may be a random number processor.

A string processor according to an embodiment may be a processing box.

An embodiment may provide a string of biased output values wherein the number of outputs and the occurrence probability of each output can be determined by a user. The output values and the occurrence probability of each output value may be different to the input values and/or the input occurrence probability. The input values may be binary values. The input values/input string may be unbiased. The input values/input string may be random; alternatively the input values/string may not be random.

An embodiment may comprise a processing unit and a memory device. The processing unit may be configured to perform compare, assign and output functions. The memory device may store a code-word set.

The number of outputs and the occurrence probability of each output may be determined through the use of the code-word set. The output string may comprise any number of output values. An embodiment comprises at least two output values. Comparing a string of values to the code-word set may comprise comparing the string of values to each of the code-words. The number of code-words may depend upon the input string, desired output probabilities and computational complexity. Each code-word may be a single input value, or a combination of input values. A code-word may be a specific sequence of input values which, when matched by a considered string of input values, may assign an associated output value to the output string.

Each code-word may be associated with an output value, as such, each output value has a corresponding code-word. The part of the input string which is compared to the code-words in the code-word set may be a comparison string. The comparison string may comprise an input from the input string. The comparison string may comprise at least one input from the input string. The comparison string may be a subset, or part, of the input string. The comparison string may be compared to the code-words contained in the code-word set to see if it is the same as any of them.

A processing unit may be further configured to: read a next available input in the input string; and add the next available input to the comparison string, wherein an available input is an input that is not part of the comparison string; when the comparison string does not match a code-word.

The comparison string may incorporate one extra input (the next available input) every time the comparison string is compared to the code-words and no match is found. When the compared comparison string does not match a code-word, the processing unit may read the next available input in the input string; add the next available input to the comparison string; and compare the new comparison string to the code-words in the code-word set. The comparison string—which now comprises an additional input—may be compared to the code-words. If the comparison string does not match a code-word, the next available input may be added to the comparison string. This may go on indefinitely, until the comparison string matches a code-word.

The comparison string may, therefore, comprise the first 1+n available inputs, where an available input is an input that has not previously been part of the comparison string and n is the number of times the comparison string has been compared to the code-word set without matching a code-word. An input that has been, or is, part of the comparison string may not be an available input. As such, the comparison string may comprise the first x inputs, with x increasing every time the comparison string is compared to the code-word set and a match is not found. When the comparison string matches a code-word, the output value with which the matched-code-word is associated may be assigned to the output string or output.

Upon initialization of the string processor the next available input, $i_x$, is the first input in the input string and so may be read or added to the comparison string. If the comparison string, $i_x$, is compared to the code-word set and does not match a code-word, a second input in the input string, $i_{x+1}$, (which is now the next available input) may be added to the comparison string. The comparison string is now $i_x i_{x+1}$.

The processing unit may be further configured to: discard the comparison string when the comparison string matches a code-word in the code-word set.

A comparison string which has matched a code-word, resulting in an output value being assigned to the output may be discarded, disregarded or reset. Once a comparison string has matched a code-word, the inputs in that comparison string are no longer part of the comparison string. When the comparison string has been discarded or reset, the comparison string comprises no inputs. The next available input in the input string may then be read into the comparison string, being the first input in the comparison string.

The code-words may be prefix codes, wherein no code-word is a prefix of another one.

As a comparison string must match the code-word for the associated output value to be output or assigned to an output, generally speaking, the longer the code-word, the less likely the code-word will match the comparison string and the less likely this code-word will cause the associated output value to be output.

Code-words comprising fewer values may generally have a higher occurrence frequency than code-words comprising more values. With an unbiased binary input string, the highest occurrence probability that an output value can have with only a single code-word being associated with it, is 0.5. Thus, if the occurrence probability for an output is to be higher than 0.5, more than one code-word must be associated with it. This may apply in relation to non-binary, as well as binary input strings. This may also apply in relation to biased input strings.

More than one code-word may be associated with a single output value. In this way, the specific occurrence probabilities for each output value can be tailored by careful selection of the associated code-words. By selecting different lengths and numbers of code-words corresponding to different output values, the probabilities of the respective outputs can be specified as being different. Thus, a biased output string can be obtained from an unbiased input string. In an embodiment, an output string comprises two output values; an output probability of an output value is defined by the number and length of the code-words corresponding to that output value and the output probability of the first output value may be larger than the output probability of the second output value.

There may be no limit to the number of code-words associated with a specific output value. As such, substantially any desired output probability, or a sufficiently close estimate, can be achieved for a specific output value. Having more than one code-word associated with a single output value may allow a user to accurately define the bias of the string processor. Specifically, it increases the accuracy with which an occurrence frequency can be specified.

The processing unit may be configured to allow a user to define the code-word set.

The user may set the code-words and assign certain code-words to certain outputs. The user may be able to define the code-word set. The user may be able to define the code-words. The user may be able to change the code-word set by amending the number, length and composition of code-words. Alternatively, the code-words may be set and assigned to certain outputs automatically, depending on the application of the string processor.

A coding tree structure may be used to compare the comparison string to the code-word set.

The processing unit may be configured to implement the compare operation using a coding tree structure. The coding tree structure may be a Huffman coding tree structure An embodiment may be implemented using a coding tree structure. The coding tree structure may be stored on the memory device and implemented by means of the processing unit. The coding tree structure may implement the read, write, compare and assign functions.

The coding tree structure may be used as an efficient method to read and compare at least part of an input string to a set of code-words and outputting an output value to an output string when the comparison string matches a code-word.

A coding tree structure may comprise a series of read and compare operations, wherein a decision tree structure iteratively determines the value of the most recent input added to the comparison string and compares the comparison string to the set until the comparison string matches a code-word.

The coding tree may be implemented by means of a computer program. The coding tree structure may be configured to be run on a large set of NAND gates. The coding tree structure may be run on a FPGA or ASIC.

A next available input may be added to the comparison string after a, or each, decision where the comparison string does not match a code-word. Alternatively, it may take more than one decision step to determine whether the comparison string matches a code-word in the code-word set. A next available input may be added to the comparison string after two, three, or more than three decisions—the number of decisions required may depend upon the number of values in the input string and the number of code-words, as well as the specific implementation of the coding tree.

A Huffman-type coding tree structure may provide an efficient method of implementing an embodiment according to the present disclosure.

Traditionally, Huffman coding trees are used to derive an efficient manner of encoding a message. However, the same approach may be used for different tasks in accordance with some embodiments of the present disclosure, as described below. Other implementations may also be applicable.

When a Huffman coding tree is used to compress and decompress information, the sequencing order of the encoded message is maintained between encoding and decoding. Any disruption or shuffling applied to a sequence of encoded bits (the output from the coding tree) would result in an error during decoding. As such, using a coding tree (such as a Huffman coding tree) to implement an embodiment as disclosed herein, to provide an output string with a certain biased output probability in which the sequencing order is not important and that can then be merged with a further output string without detrimental effect, can be differentiated from using a coding tree to encode a string of values for compression, where the output string sequencing should not be disrupted or shuffled.

In an embodiment, the sequencing order of the input string may be rearranged or disrupted before the comparison string is compared to the code-word set. The sequencing of the output string may be rearranged or disrupted before being output from the string processor. The output values in the output string may not be output in the same order as that in which they were assigned to the output string. Rearranging of the input or output values does not affect the efficacy of embodiments described herein so long as such a rearranging is independent of the values of the symbols in the input or output strings.

The input string may be a binary input string.

Although the input string according an embodiment is an unbiased binary string, in other embodiments, the input string may be biased. The input may be a biased binary string, or an unbiased or biased string that comprises more values than a binary input string. The input string may be a biased or unbiased decimal or hexadecimal input string.

The input string may be a quality assessed binary input string.

The input string may be a quality assessed random binary input string.

In some embodiments, the input string may not be random.

The processing unit may be configured to receive a quality assessed binary input string.

The input string may have been generated, manipulated, tested or assessed. The input string may have been assessed by an independent statistical test or suite.

The input string may not comprise a string of random values, but rather a string of non-random values. An input string may be generated by any type of random number generator, or string generator.

Some embodiments described herein may use a quality assessed binary input string. An input string which has been quality assessed may be referred to as a quality assessed input string, or may have come from a high-quality RNG. The term high-quality RNG may refer to a random number generator that has been subject of a quality assessment of some kind. Examples of suitable quality assessments may include ideal description, scientific argument and statistical test.

The input string may comprise two or more separate input strings merged together. The input string may be formed of two or more, combined, strings. The input string may be formed of two or more outputs from a random number generator(s) and/or a quality-random number generator(s), combined.

Equally, a plurality of string processors according to the present disclosure may be arranged so that their outputs (and hence output strings) merge to form a single output string. Such an arrangement may be required to ensure a certain value output (or bit) rate is achieved.

According to an embodiment, a random number generator may comprise a string generator and a string processor. The string processor may be according to an embodiment. The random number generator may output a biased output string. The random number generator may output a random, biased output string. The output string of the random number generator may be an output string of the string processor.

An output string of the string generator may be an input string of the string processor and may be referred to as an intermediate string. The intermediate string may be unbiased. The intermediate string may be random. The term intermediate string is used to ensure clarity. The output string of the string generator may be the input string of the string processor and may be referred to as an intermediate string for clarity. The intermediate string may comprise intermediate values. As such, an intermediate value may refer to an output value of the string generator and/or an input value of the string processor. The output string of the string processor may be biased.

A random number generator according to an embodiment may comprise a string generator configured to output an unbiased intermediate string comprising at least two intermediate values, and a string processor configured to output a biased output string comprising a first output value and a second output value given an unbiased input string of at least two values, wherein the input string of the string processor is the intermediate string; wherein the string processor comprises a processing unit and a memory device; the memory device storing a code-word set, wherein the code-word set comprises a plurality of code-words, each code-word comprising at least one intermediate value, wherein each string processor output value has at least one corresponding code-word; the processing unit being configured to: compare a comparison string to the code-words, wherein the comparison string comprises an input from the string processor input string; and assign an output value to the string processor output string when the comparison string matches a code-word, wherein the assigned output value is that to which the matched code-word corresponds; wherein an output probability of an output value is defined by the number and length of the code-words corresponding to that output value; and the output probability of the first output value is larger than the output probability of the second output value. The string processor output string may be the random number generator output string.

The string generator may comprise a pseudo-random number generator or a true random number generator. The string generator may comprise a quality-assessed, or quality, random number generator.

The string generator may produce a string of random values or bits derived from a measurement of a physical phenomenon. The measured value may be compared to a, or a series of, threshold(s) to determine the value of an output. A string of readings may provide an output string. The physical phenomenon may be essentially random atomic or subatomic physical phenomenon. Examples of such phenomenon may include atmospheric noise, radioactive decay, thermal noise, shot noise, clock drift, radio noise and/or transmission of photons through a half-silvered mirror.

The output string from the string generator may be an unbiased string. The output string of the string generator may be random. The output string of the string generator may be binary. The output string from the string generator may comprise a number of strings, merged together. As such, the intermediate string may comprise a number of strings, merged together. The input string of the string processor may comprise a number of strings, merged together.

The features discussed anywhere herein in relation to a string processor apply, mutatis mutandis, to a string processor of a random number generator as described above.

In an embodiment, a computer readable carrier medium carrying computer executable instructions may be provided which, when executed on a processor with a memory device, may cause the processor and memory device to be a string processor as disclosed herein.

A string processor as described herein may be suitable for use in a Quantum Key Distribution (QKD) system.

The QKD system may use light. Embodiments disclosed herein may control the light intensity values. Embodiments disclosed herein may control the encoding and/or decoding bases prescribed by the QKD protocol. A particular example may be the BB84 protocol with decoy states, wherein an embodiment according to the present disclosure may output three values: u, v and w, which may correspond to a "signal", "decoy" and "vacuum" state, respectively. It may be desirable for each of these output values to occur with a different output frequency. As such, a string processor as described herein may be used in such a QKD system. Another example is the so-called "efficient BB84 protocol" where in, an embodiment, two bases, Z and X, may be used. These bases can be selected with different occurrence probabilities. As such, a RNG as described herein may be used. It is also possible to have jointly an efficient BB84 protocol with decoy states. In this case, multiple output symbols (Zu, Zv, Zw, Xu, Xv, Xw) have to be selected with different probabilities and the RNG described herein may be used.

A string processor as described herein may be suitable for use in modelling random events.

For example, a string processor as described herein may be used to simulate or model a random walk type of problem, e.g. modelling quantum scattering.

Embodiments as described herein may enable a user to set certain parameters such as the number of output values and the output probability of each value and then model the behaviour based on a random input which has had its quality assessed and or certified. This may greatly increase the reliability and relevance of such models over current techniques.

A string processor as described herein may be suitable for use in simulating a game of chance.

For example, a string processor as described herein may be used to simulate or model a card game or roulette.

Similarly, embodiments as described herein may enable a user to set certain parameters such as the number of output values and the output probability of each value and then simulate the resulting behaviour based on a random input which has had its quality assessed and or certified. This may greatly increase the reliability and relevance of such simulations over current techniques.

According to an embodiment, a method may be for outputting a biased output string comprising a first output value and a second output value given an unbiased input string of at least two input values, the method comprising: comparing a comparison string to a code-word set, wherein the comparison string comprises an input from the input string and the code-word set comprises a plurality of code-words, each code-word comprising at least one input value. Each output value may have at least one corresponding code-word. The method may assign an output value to the output string when the comparison string matches a code-word, wherein the assigned output value is that to which the matched code-word corresponds; wherein an output probability of an output value is defined by the number and length of the code-words corresponding to that output value; and the output probability of the first output value is larger than the output probability of the second output value.

A string processor according to an embodiment may implement a method according to an embodiment. As such, discussion relating to steps for which the string processor may be configured applies mutatis mutandis to a method according to an embodiment. A method according to an embodiment may comprise any of the steps a string processor according to an embodiment may be configured to undertake.

A field-programmable gate array (FPGA) may be configured to operate as a string processor as described herein.

According to an embodiment, a FPGA may comprise a module configured to operate as a string processor as disclosed herein.

The module may comprise: a down counter for monitoring the number of inputs in the comparison string; a shift register for shifting the input string by the number of inputs in the comparison string; and a coding tree decision structure; the shift register and down counter being operably linked to the coding tree decision structure.

The module may further comprise: a first in first out memory unit for storing and assigning the output value associated with a matched code-word from the coding tree structure to an output from the module.

The field-programmable gate array (FPGA) or a module thereof may comprise at least one shift register. A shift register or shift registers may be used to effectively enter the input string into a coding tree.

The field-programmable gate array or a module thereof may comprise a down counter. A down counter may be linked to a coding tree, or coding tree decision structure, and a shift register, and may set or monitor how many values are in the comparison string. A down counter may set how many times the FPGA should wait to ensure these inputs are not reused.

The FPGA or a module thereof may comprise a first in first out (FIFO) memory unit. A FIFO memory unit may store the output data, before it is output from the FPGA.

In order to meet a certain output value rate, an input clock rate of a FPGA may be set at a faster speed than the output clock rate, e.g. twice the output clock rate if the output rate is larger than half the input rate.

A FPGA may comprise, or be configured to comprise at least two string processors as described herein, wherein the outputs of the at least two string processors are merged into a single string.

According to an embodiment, a FPGA may comprise a first and second module, the first and second modules each being configured to operate as a string processor as disclosed herein, wherein the outputs of the first and second modules are combined into a single output string. The outputs in the first and second modules may be combined in order to match the field-programmable gate array output rate to the input rate.

According to an embodiment, a FPGA may comprise a first and second module, the first and second modules being configured to operate as a first string processor and a second string processor as disclosed herein, wherein the first module comprises: a first down counter for monitoring the number of inputs in the comparison string of the first string processor; a first shift register for shifting the input string of the first string processor by the number of inputs in the comparison string of the first string processor; a first coding tree decision structure; the first shift register and first down counter being operably linked to the first coding tree decision structure; and a first FIFO memory unit for storing and assigning the output value associated with a matched code-word from the first coding tree structure to an output from the first module; and the second module comprises: a second down counter for monitoring the number of inputs in the comparison string of the second string processor; a second shift register for shifting the input string of the second string processor by the number of inputs in the comparison string of the second string processor; a second coding tree decision structure; the second shift register and second down counter being operably linked to the second coding tree decision structure; and a second FIFO memory unit for storing and assigning the output value associated with a matched code-word from the second coding tree structure to an output from the second module; wherein the outputs of the first and second modules are combined into a single output string. The outputs in the first and second modules may be combined in order to match the field-programmable gate array output rate to the input rate.

Each string processor may be implemented in a processing block, or module. Each module may comprise a processing unit and memory device, in addition to any FIFO memory unit. Each module may comprise the features described above in relation to a FPGA.

Each module may be given a different unbiased input string. Each module may be given its own unbiased input string. Each module may be given the same unbiased input string.

Each module may comprise at least one shift register. A shift register or shift registers may be used to enter the input string into a coding tree.

Each module may comprise a down counter. A down counter may be linked to a coding tree and a shift register, and may set or monitor how many values are in the comparison string. A down counter may set how many times each module should wait to ensure these inputs are not reused.

Each module may comprise a first in first out (FIFO) memory unit. The FIFO memory unit may store the output data of the string processor of the respective module, before it is output from the FPGA.

The FPGA may further comprise: an output control unit configured to decide from which of the first and second FIFO memory units to read an output to the single output string; and a Select unit configured to read the outputs from the first and second FIFO memory units and output the single output string.

The FIFO memory unit may be used to store the output data in each module, before it is merged with data from the other module or modules in a Select unit. A Select unit may output the final output string from the FPGA. A Select unit may merge the two output strings from the modules into a single FPGA output string.

An output control unit may comprise, use, create, read or send an "almost empty" signal. An "almost empty" signal or function may be used with each module. An almost empty may link the FIFO and the Select unit. An almost empty may indicate when there are less than N symbols stored in the output FIFO. N may be a small value greater than 0. An output control unit may use the almost empty from the two modules to decide from which side to read. Once the output control unit has used the almost empty to decide from which side to read, a "read" function in each module may be used to pull the relevant output value out of the relevant FIFO memory, into the Select unit.

The almost empty may be required to avoid a read at empty with respect to the FIFO (underflow). It may take a finite time (i.e. number of clock cycles) from a read operation to update the condition flags of the FIFO. N may be determined by the latency of the round trip of read to almost empty update. However the depth of the FIFO can be chosen large enough to reduce the probability of underflow to practically zero.

The use of an Almost Empty illustrates how use of a coding tree used in the present embodiments may differ from previous uses. Use of an Almost Empty and Select unit may result in the output strings from two or more modules being assembled together to provide a single output string. This will inevitably result in disruption or shuffling of the initial sequencing order of the individual strings. Disruption or shuffling of the sequencing of a string in a compression/decompression method based on a coding tree would result in an error, whereas disruption or shuffling of the sequencing of the strings used in embodiments based on a coding tree as disclosed herein, does not.

In an embodiment, due to the presence of 2 or more parallel functional modules connected by a Select function, the sequencing of the outputs, or output string, may not be the same as the sequencing of outputs from the coding tree structures contained in each functional module. As a result, the sequencing of the outputs, or output string from a FPGA may not be the same as the sequencing of outputs from the coding tree structure, or module. This will not affect the efficacy of embodiments described herein because the rearrangement operated by the Select function is independent of the values of the symbols in the strings. On the contrary, it would prevent any implementation of a compression/decompression method based on a coding tree.

Each of the string processors may comprise or receive its own input string. Each of the modules may comprise or receive its own input string. A, or each, input string may be biased or unbiased, binary or non-binary. Each input string may be an unbiased, binary, high-quality RNG A quantum communications system comprising a string processor as described herein is according to the present disclosure.

A quantum communications system comprising a FPGA as described herein is according to the present disclosure.

According to an embodiment is a sending unit for a quantum communications system, the sending unit comprising: a quantum bit source configured to generate a plurality of quantum bits for sending to a receiving unit; an intensity modulator arranged to modulate the intensity of a portion of the quantum bits; and a phase modulator arranged to modulate the phase of a portion of the quantum bits; wherein the intensity modulator and phase modulator receive a biased output string from a string processor as described herein.

According to an embodiment is a sending unit for a quantum communications system, the sending unit comprising: a quantum bit source configured to generate a plurality of quantum bits for sending to a receiving unit; and an intensity modulator arranged to modulate the intensity of a portion of the quantum bits; a phase modulator arranged to modulate the phase of a portion of the quantum bits; and at least one FPGA as described herein; wherein the intensity modulator and phase modulator receive a biased output string from the FPGA.

According to an embodiment is a receiving unit for a quantum communications system, the receiving unit comprising: at least one detector for detecting received quantum bits; a phase modulator arranged to modulate the phase of a portion of the received quantum bits for measurement; wherein the phase modulator receives a biased output string from a string processor as described herein.

According to an embodiment is a receiving unit for a quantum communications system, the receiving unit comprising: at least one detector for detecting received quantum bits; a phase modulator arranged to modulate the phase of a portion of the received quantum bits for measurement; and a FPGA as described herein; wherein the phase modulator receives a biased output string from the FPGA.

According to an embodiment is a quantum communication system comprising: a sending unit comprising: a quantum bit source configured to generate a plurality of quantum bits for sending to a receiving unit; and an intensity modulator arranged to modulate the intensity of a portion of the quantum bits; and a phase modulator arranged to modulate the phase of a portion of the quantum bits; and a receiving unit comprising: at least one detector for detecting received quantum bits; a phase modulator arranged to modulate the phase of a portion of the received quantum bits for measurement; wherein at least one of the intensity modulator and phase modulator in the sending unit and the phase modulator in the receiving unit receives a biased output string from a string processor as described herein.

Alternatively, all of the intensity modulator and phase modulator in the sending unit and the phase modulator in the receiving unit may receive a biased output string from a string processor as described herein.

According to an embodiment is a quantum communication system comprising: a sending unit comprising: a quantum bit source configured to generate a plurality of quantum bits for sending to a receiving unit; and an intensity modulator arranged to modulate the intensity of a portion of the quantum bits; and a phase modulator arranged to modulate the phase of a portion of the quantum bits; the quantum communication system further comprising: a receiving unit comprising: at least one detector for detecting received quantum bits; a phase modulator arranged to modulate the phase of a portion of the received quantum bits for measurement; and the quantum communication system may further comprise: at least one FPGA as described herein; wherein at least one of the intensity modulator and phase modulator in the sending unit and the phase modulator in the receiving unit receives a biased output string from the FPGA.

Alternatively, all of the intensity modulator and phase modulator in the sending unit and the phase modulator in the receiving unit may receive a biased output string from the FPGA.

A quantum communications system may comprise a sender and receiver as described herein.

A quantum bit may be encoded in a light pulse or in a single-photon pulse. A quantum bit source may be a source of light pulses or of single photons.

Any of the above intensity modulators or phase modulators may be controlled by the output of a string processor or FPGA as described herein. For example, each biased output value may correspond to a certain intensity—as such, the quantum bits may be modulated to one of a number of different intensities (the number of different intensities being determined by the number of different output values), with each intensity having a different occurrence frequency, determined by the output frequency or probability of the specific output value. The same can apply, mutatis mutandis to the phase modulator.

A quantum communications system, or a sender or receiver thereof, may comprise an intensity modulator. An intensity modulator may be used to implement a decoy state protocol. An intensity modulator may be arranged to modulate the intensity of a portion of the quantum bits. The intensity modulator may modulate all of the quantum bits. The intensity modulator may modulate the quantum bits by a number of different factors or amounts. The intensity modulator may randomly select which quantum bits to modulate. The random selection may be biased. Each quantum bit may be randomly modulated to one of a number of predetermined intensities, there may be three intensity values, $\{u, v, w\}$, corresponding to "signal", "decoy" or "vacuum" respectively. The intensity values may occur with an occurrence frequency determined by the user $\{f_u, f_v, f_w\}$. A string processor or FPGA may control or implement the random selection of the intensity values, according to an occurrence frequency determined by a user.

A quantum communications system, or a sender or receiver thereof, may comprise a phase modulator. A phase modulator may be arranged to modulate the phase of a portion of the quantum bits. A phase modulator may be arranged to modulate the phase of all of the quantum bits. Each quantum bit may be randomly modulated to one of a number of predetermined phases by the phase modulator. Each quantum bit may be randomly modulated to one of two phases by the phase modulator. The occurrence frequency of each phase modulation may be biased. The occurrence frequencies may be determined by a user.

The sender and receiver may have a phase modulator.

The same string processor or FPGA as described herein may control both the intensity and phase modulation. Alternatively, different string processors or FPGAs may control each modulator.

The quantum communications system may use the transmission of light and the string processor may control at least one of light intensity values or encoding and decoding bases prescribed by a quantum communications protocol.

A quantum communications system may comprise two string processors or FPGAs according to the present disclosure. Alternatively, one, three or more than three string processors or FPGAs according to the present disclosure may be implemented in a quantum communications system.

The quantum communications system may comprise a sender sending an encrypted key to a receiver. The quantum communications system may comprise a light source or photon source.

The quantum communications system, or a sender or receiver thereof, may comprise an input beam splitter. Intensity-modulated pulses may be split by an input beam splitter. The quantum communications system may comprise two or more paths. One path—the "first path"—may go through a phase modulator. A phase modulator may be after the beam splitter. A phase modulator may randomly modulate the photons by a specific phase, thus outputting the photons with one of two bases $\{Z, X\}$. The occurrence ratio between the two bases may be biased, and may be predetermined by a user. A string processor according to the present disclosure, or a FPGA according to an embodiment may be used to control the phase modulator for the basis selection. The string processor or FPGA controlling the basis selection in the phase modulator may be the same string processor or FPGA that controls the intensity modulator. Alternatively, an additional string processor or FPGA may be used to control the phase modulator.

A second path from the input beam splitter may be sent through an optical delay.

The quantum communications system, or a sender or receiver thereof, may comprise an optical transmission line and two polarising beam splitters. Light pulses or photons from the first and second path may be sent to the receiver via an optical transmission line and two polarising beam splitters. The sender's polarising beam splitter may polarise pulses or photons from the two different paths and send them through the optical transmission line.

As the pulses or photons are polarised, a receiver's polarising beam splitter can separate the two paths of pulses or photons into the two paths again, this time sending the pulses or photons sent through the sender's phase modulator through an optical delay in the receiver and the pulses or photons not sent through the sender's phase modulator through a phase modulator in the receiver. The phase modulator of the receiver may be the same kind as that in the sender.

A receiver's phase modulator may randomly select one of two bases in which to measure the received pulses or photons, by selecting a phase modulation. Similar to the sender's phase modulator, the receiver's phase modulator may randomly modulate the photons by a specific phase, thus effectively measuring the photons with one of two bases $\{Z, X\}$. The occurrence ratio between the two bases may be biased, and predetermined by a user to be equal to that of the sender's phase modulator. A further (or the same) string processor arrangement, or FPGA according to an embodiment may be used to control this second phase modulator for the basis selection.

The two paths in the receiver may be combined at an output beam splitter. A quantum communications system may comprise a variable delay line. A variable delay line may be used to fine tune the delay in the receiver to ensure two optical delays combine properly and that both overall paths experience the same delay.

The quantum communications system, or a sender or receiver thereof, may comprise one, or more than one photon detectors. Photon detectors may investigate the interference between the two paths; and from these results a key may be derived.

FIG. 1 schematically illustrates the general scheme of some embodiments disclosed herein.

A string of values or symbols is generated by a string generator 11. The string of values or symbols—the input string 12—comprises the values or symbols $\{s_1, s_2, \ldots, s_m\}$ occurring with frequencies $\{f_{s1}, f_{s2}, \ldots, f_{sm}\}$, where m is an integer and $f_{sm}$ is the occurrence frequency, or probability, of the input symbol $s_m$. For example, if $f_{s2}$ is 0.25, on average a quarter of the inputs in the input string will be $s_2$. The input string 12 may be referred to as an intermediate string in some embodiments.

The input string 12 is fed into a string processor 10 according to an embodiment. The string processor 10 outputs a further string of values or symbols—the output string 13. The output string 13 of FIG. 1 comprises the values or symbols $\{s'_1, s'_2, s'_n\}$ with the output frequencies $\{f_{s'1}, f_{s'2}, \ldots, f_{s'n}\}$, where n is an integer and $f_{s'n}$ is the occurrence frequency, or probability, of the output symbol $s_n$. For example, if $f_{s'2}$ is 0.125, on average an eighth of the outputs in the output string will be $s'_2$.

The string processor receives an input string of values or symbols $\{s_1, s_2, \ldots, s_m\}$ occurring with frequencies $\{f_{s1}, f_{s2}, \ldots, f_{sm}\}$, processes this string and outputs an output string of values or symbols $\{s'_1, s'_2, \ldots, s'_n\}$, with the output frequencies $\{f_{s'1}, f_{s'2}, \ldots, f_{s'n}\}$ where n does not necessarily equal m and $f_{s'1}, f_{s'2}, \ldots, f_{s'n}$ does not necessarily equal $f_{s1}, f_{s2}, \ldots, f_{sm}$. Alternatively, n may equal m, and/or $f_{s'n}$ may equal $f_{sm}$.

Figures 2, 3:
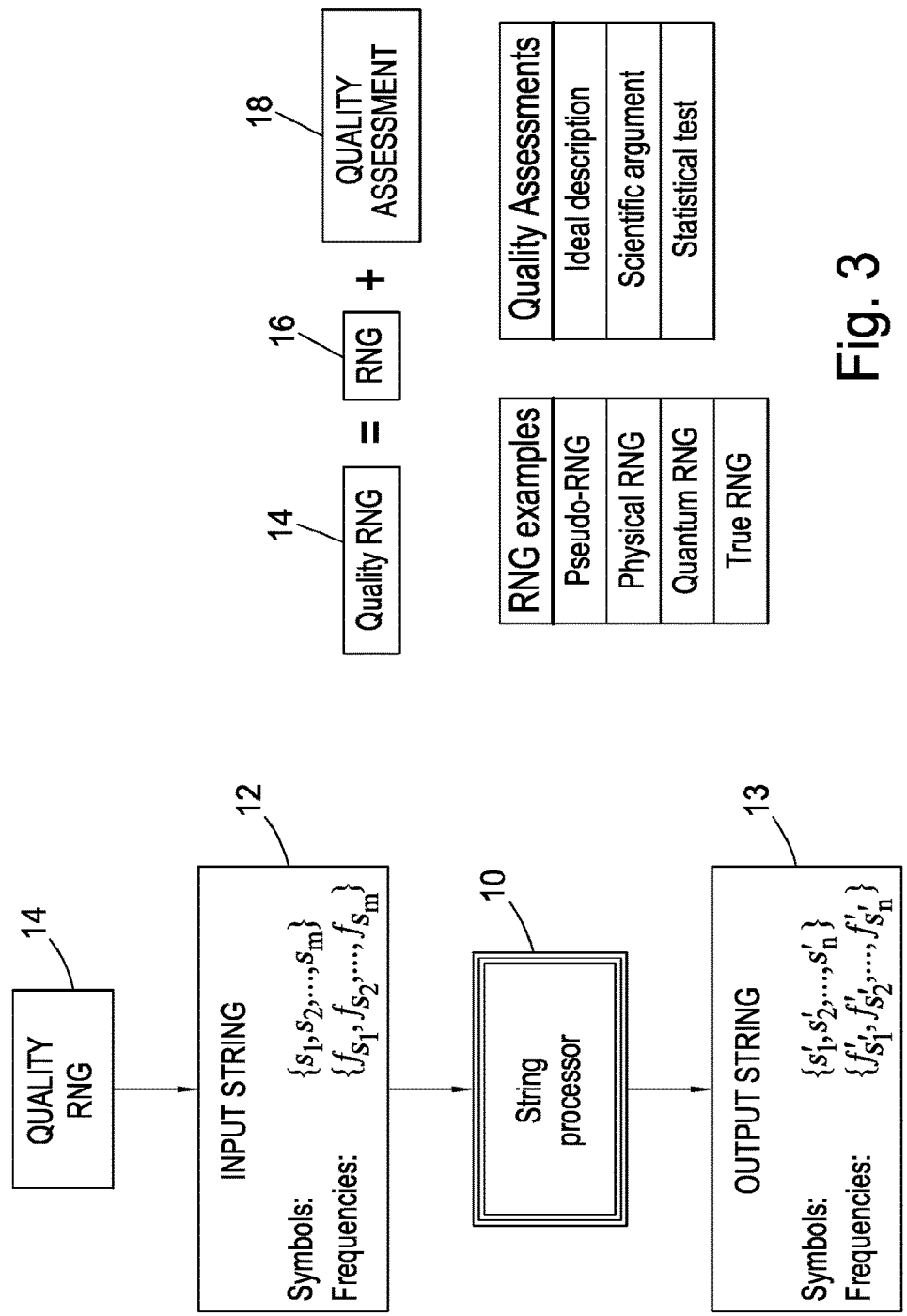
FIG. 2 schematically illustrates an embodiment as a string processor with a high-quality random unbiased input string and an output biased string featuring the same assessable quality of randomness.
FIG. 3 schematically shows a high-quality RNG, with examples of RNGs and quality assessments.

As schematically illustrated in FIG. 2, the string generator 11 may be a high-quality RNG 14. The high-quality RNG may then generate the input string 12. The string processor 10 of FIG. 2 will operate as described in relation to FIG. 1.

FIG. 3 schematically illustrates a high-quality RNG 14. The term "high-quality RNG" 14 refers to a RNG 16 that has been the subject of a quality assessment 18 of some kind. Examples of RNGs 14 are given in FIG. 3 as PRNGs, Physical-RNGs, Quantum-RNGs and TRNGs. Examples of suitable quality assessments are also provided in FIG. 3 and may include ideal description, scientific arguments and statistical tests.

A variety of statistical analysis tools and suites exist to assess the quality of random number generators, although these are generally either incompatible, or ill-suited for use with biased strings of values. The statistical analysis suites produced by the National Institute of Standards and Technology (NIST), for example the 800-22 statistical test suite, comprises 15 tests which result in a "p-value". The p-value for each test is defined as "the probability a perfect RNG would have produced a sequence less random than the sequence that was tested, given the kind of non-randomness assessed by the test"—A. Rukhin, J. Soto, J. Nechvatal, M. Smid, E. Barker, S. Leigh, M. Levenson, M. Vangel, D. Banks, A. Heckert, et al., A statistical test suite for random and pseudorandom number generators for cryptographic applications (2001).

These suites are not conceived to be used with biased strings. Inputting a biased string into an NIST suite will output a failure result. Further examples of methods for assessing the randomness of strings of values include the ideal description and scientific argument methods. Again, these are not well suited for use with biased strings. Scientific arguments based on tools such as "randomness extractors" and "universal-2 functions" become significantly more difficult to use on biased strings as the larger the bias, the larger the sample necessary for an estimation. This often makes these methods unsuitable for use with biased strings. As such, it is difficult to provide a biased string of values or bits with a statistically proven level of quality.

For examples and discussion on scientific argument methods, see D. Frauchiger, R. Renner, and M. Troyer, (2013), quant-ph/1311.4547v1; and Y. Z. Law, J.-D. Bancal, and V. Scarani, (2014), quant-ph/1401.4243v1.

FIG. 4A highlights that the string generator 11 may in fact comprise a plurality of string generators. For example, the string generator 11 of FIG. 1 comprises 2, 3, 4 or more than 4 individual string generators.

FIG. 4B highlights that the high-quality RNG 14 of FIGS. 2 and 3 can comprise a plurality of Q-RNGs. For example, the Q-RNG 14 of FIGS. 2 and 3 comprises 2, 3, 4 or more than 4 individual Q-RNGs. In the Q-RNG 14 of FIG. 3, each RNG 16 may comprise a plurality of RNGs (for example one, two, three, four or more than four) and each may be subjected to a quality assessment 18, thus resulting in a plurality of Q-RNGs.

Figure 5:
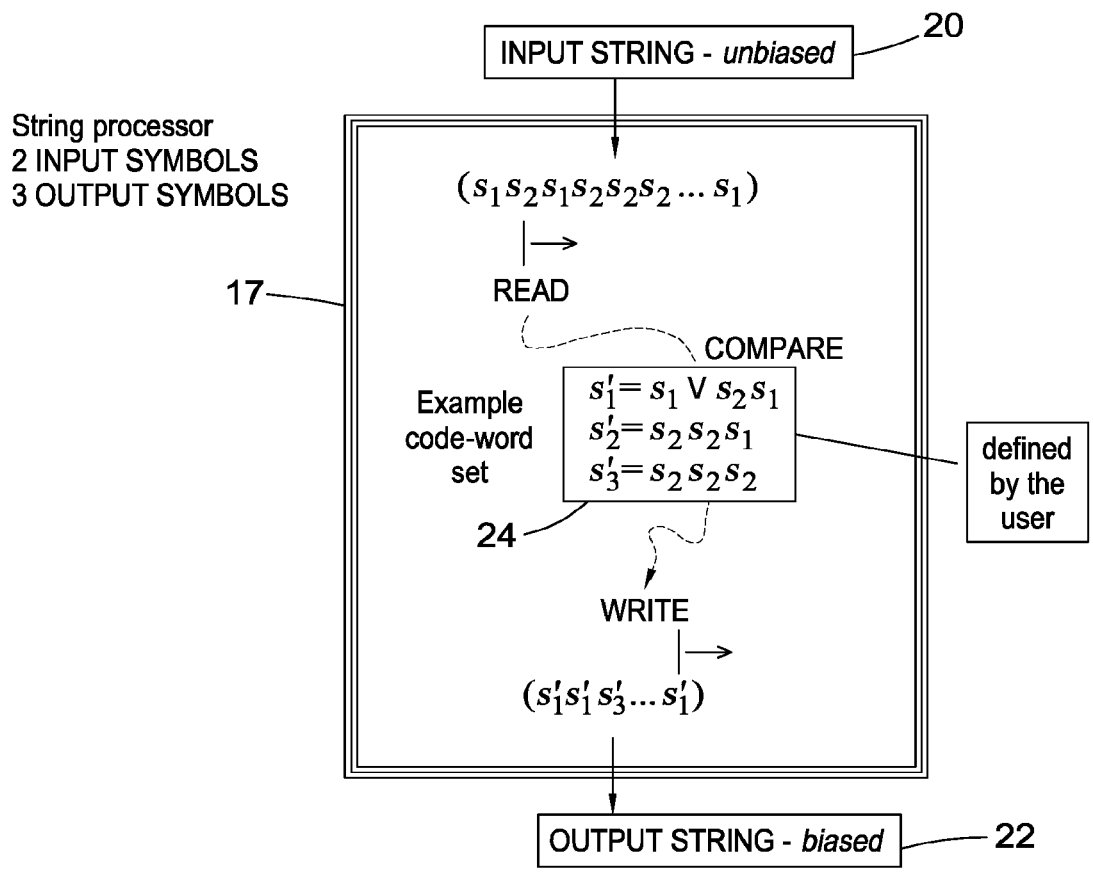
FIG. 5 schematically illustrates the operation of an embodiment.
Figure 6:
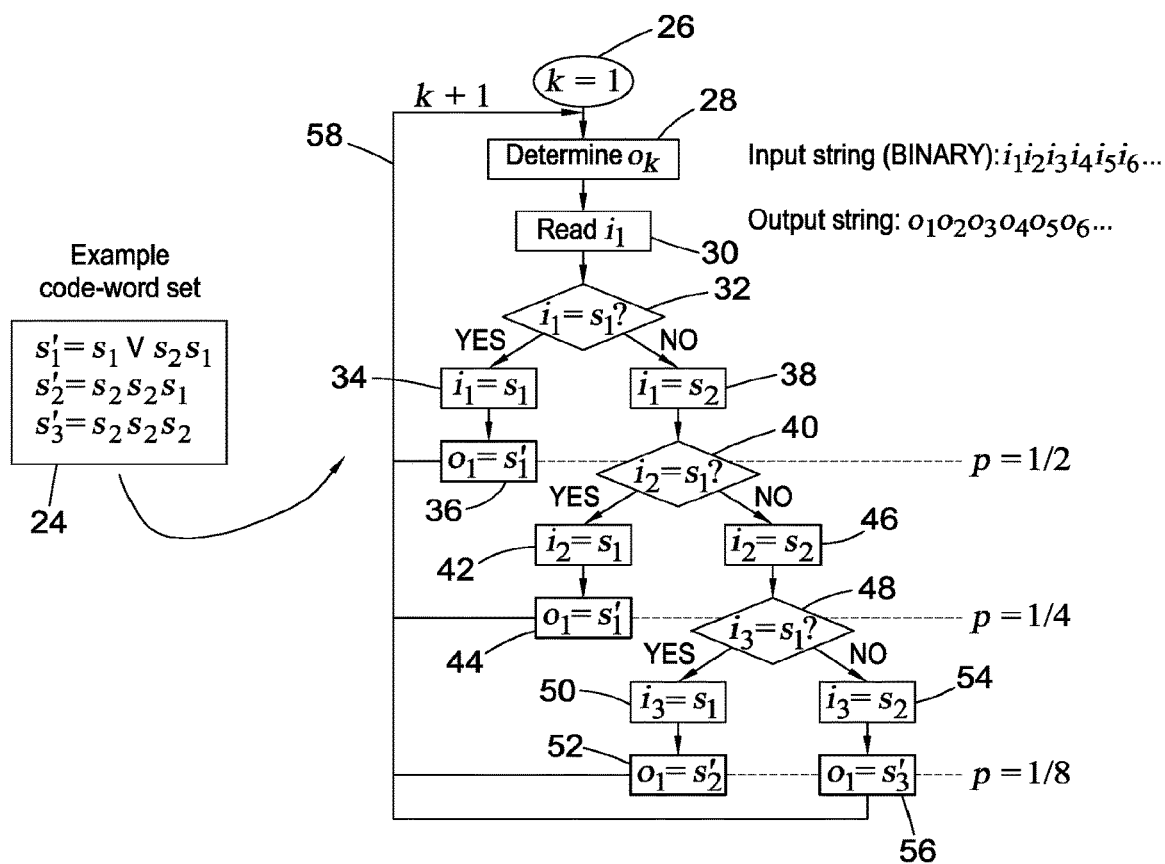
FIG. 6 schematically illustrates a coding tree of an embodiment for creating a biased output string of three values ($s'_1$, $s'_2$, $s'_3$) from an unbiased input string of two values ($s_1$, $s_2$)

FIG. 5 illustrates a string processor 17 according to an embodiment which utilises the coding tree of FIG. 6. The string processor 17 receives an unbiased string of values 20 comprising—in this case—the two values, $s_1$ and $s_2$. The string processor 17 then undertakes a sequential bitwise read/compare/write operation using the coding tree of FIG. 6 to compare the input string 20 with a code-word set 24, defined by the user. A sequential read/compare/write operation is used for practical purposes. In other embodiments, the read/compare/write operation may not be sequential. The code-word set 24 is stored on a memory device. The string processor comprises a processing unit configured to compare values to the code-word set 24 and assign an output value to the output string.

The input string may comprise more than two values. The input string may comprise 3, 4 or more than 4 values.

The string processor 17 of FIG. 5 outputs an output string 22 of values. In the embodiment of FIG. 5, the output string 22 comprises three values, $s'_1$, $s'_2$ and $s'_3$. An output string may alternatively, however, comprise 2, 4, or more than 4 output values.

The output string 22 is biased, with the bias being defined by the user through the selection of the code-word set 24. A code-word set, according to the present embodiment, is the group of code-words used to assign an input or a string of inputs to an output. This will be discussed further with reference to FIG. 6.

FIG. 6 illustrates an implementation of an embodiment to perform the read/compare/write operations. The coding tree structure of FIG. 6 is based on a Huffman coding tree. However, the Huffman coding tree is just one example of a suitable coding tree structure. Other coding tree implementations will also be applicable.

In the illustrative embodiment of FIG. 6, a binary input string $\{i_1\ i_2\ i_3\ i_4\ i_5\ i_6 \ldots\}$ enters the system. As with FIG.

5, the inputs take the value $s_1$ or $s_2$. An output string $\{o_1\ o_2\ o_3\ o_4\ o_5\ o_6\ldots\}$ comprising the values $s'_1$, $s'_2$ and $s'_3$ is desired as an output. Use of the coding tree structure of FIG. 6 allows a user to choose a specific output bias. This is achieved through selection of the specific code-words set 24.

The code-word set 24 determines the sequence or sequences of input values (which may be referred to as a comparison string) that trigger a certain output value to be written in the output string 22. In the embodiment of FIG. 6, an output of $s'_1$ is written in the output string 22 when the compared input or inputs—the comparison string—are either $s_1$ or $s_2s_1$; an output of $s'_2$ is written in the output string 22 when the comparison string is $s_2s_2s_1$; and an output of $s'_3$ is written in the output string 22 when the comparison string $s_2s_2s_2$. This code-word set ensures that the output bias of $s'_1:s'_2:s'_3$ is 6:1:1; the occurrence probabilities of $s'_1$, $s'_2$ and $s'_3$ are therefore 0.75, 0.125 and 0.125 respectively. This will be discussed in more detail below.

The coding tree of FIG. 6 schematically illustrates an iterative procedure which may be run by any suitably configured controller. The specific hardware used to implement a method of the present disclosure may vary. For example, the method of the coding tree of FIG. 6 may be implemented by an integrated circuit comprising a set of NAND gates. FPGA and ASIC chips are specific examples of components suitable for implementation of such a method.

Every full iteration of the processing tree of FIG. 6 ends with a value being selected to be written to the output string 22. Every iteration ends with a value being written to the output string 22. Depending on the code-words selected, every iteration will read one, or more than one, input. In the present embodiment, one, two or three inputs are read in each iteration.

With reference to FIG. 6 and the present embodiment, the process starts with k=1 at the process start 26. Each successive iteration, k, determines the corresponding output 28, $o_k$; thus the first iteration is to determine the first output, $o_1$. A process step is undertaken to read $i_1$ (30), the first input in the input string 20. This input is an available input, as it is not yet, or has not yet been, part of the comparison string. This input, the next available input, is added to the comparison string. Once has been read, a decision step 32 decides whether $i_1=s_1$. If the answer to this decision step 32 is yes, then $i_1=s_1$ (34). Comparing this result to the code-words set 24 provides a corresponding code-word for the read input. The set of the embodiment of FIG. 6 provides that an input of $s_1$ corresponds to an output of $s'_1$. In which case, $o_1$ should be set to $s'_1$ (36). The value is then written to the output string 22 as the first output $o_1$.

If the answer to the first decision step 32 of the present embodiment is no and $i_1 \neq s_1$, then $i_1=s_2$ (38). The code-word set 24 does not comprise a code-word of $s_2$ and so the next input, $i_2$, is read. The input $i_2$ is now the next available input and so is to be added to the comparison string. As such, the first two inputs in the input string 20 are now the comparison string and are being compared to the code-word set 24. A further decision 40 is now made on whether the next input, $i_2$, is equal to $s_1$. If $i_2=s_1$ (42), then the inputs compared with the code-word set 24 are now $s_2s_1$. It is defined in the set 24 of this embodiment that an input string $s_2s_1$ corresponds to an output of $s'_1$. As such, $o_1$ would be set to $s'_1$ (44). The value $s'_1$ is then written to the output string 22 as the first output $o_1$.

If the answer to the second decision step 40 of the present embodiment is no and $i_2 \neq s_1$, then $i_2=s_2$ (46). The set 24 of the present embodiment does not comprise a code-word of $s_2s_2$ and so the next available input, $i_3$, must be read and added to the comparison string. As such, the first three inputs in the input string 20 are now the comparison string and are being compared to the set 24. A further decision 48 is now made on whether the next input, $i_3$, is equal to $s_1$. If $i_3=s_1$ (50), then the inputs compared with the set 24 are now $s_2s_2s_1$. It is defined in the set 24 of this embodiment that an input string of $s_2s_2s_1$ corresponds to an output of $s'_2$. As such, $o_1$ is set to $s'_2$ (52). The value $s'_2$ can then be written to the output string 22 as the first output $o_1$.

If the answer to the third decision step 48 of the present embodiment is no and $i_3 \neq s_1$, then $i_3=s_2$ (54). The compared input string is now $s_2s_2s_2$ and the code-word set defines that an input string of $s_2s_2s_2$ maps onto an output value of $s'_2$. As such, $o_1$ may be set to $s'_3$ (56). The value $s'_3$ is then written to the output string 22 as the first output $o_1$.

Once the output $o_1$ has been assigned an output value, the comparison string is discarded, cleared, or emptied and an iteration loop 58 increases the value of k by one and start the process again. The same steps are then taken to determine a value for $o_2$. The inputs already compared to the code-word set 24 and used to determine an output should be disregarded and the next input—i.e. first input that has not already been compared (e.g. $i_4$)—is read during the next iteration. As such, the input string 20 is read and compared bitwise to produce an output string 22.

The efficiency of an algorithm such as a method according to an embodiment described herein is very important. The efficiency E is defined as the inverse of the expected number, C, of initial bits used to generate the output string. Sometimes we call C the "consumption" of initial bits. The higher the efficiency E, the smaller C, i.e. the fewer the inputs required for each output.

The use of a coding tree, the Huffman tree being one such example, results in a high efficiency E and in a low consumption C of initial bits.

The efficiency, E, of a coding tree as disclosed here can be calculated using the equation:

$$E^{-1}=C=1\times p_1+2\times p_2+\ldots +N\times p_N$$

where $p_n$ is the probability that n bits from the initial string are used.

With regard to the embodiment of FIG. 6, the consumption C of the three outputs $s'_1$, $s'_2$ and $s'_3$ is:

$$C=1\times\tfrac{1}{2}+2\times\tfrac{1}{4}+3\times\tfrac{1}{8}+3\times\tfrac{1}{8}=1.75$$

The entropy for the same example can be calculated from the probabilities of the output symbols $p(s_1')=\tfrac{3}{4}$, $p(s_2')=p(s_3')=\tfrac{1}{8}$:

$$H = -\frac{3}{4}\log_2\frac{3}{4} - \frac{1}{8}\log_2\frac{1}{8} - \frac{1}{8}\log_2\frac{1}{8} \approx 1.06$$

So we can see that the consumption C is close to the entropy H, according to the optimization requirement (d) mentioned above. As an exemplar quantitative statement of the closeness between C and H, they may be considered close if they differ in less than 2 bits.

As stated above, in the present embodiment the output bias and individual out occurrence probabilities may be set by a user. This is achieved through the choice of the code-word set.

Assuming the input string 20 is an unbiased, binary input, every decision required to reach a certain output halves the probability for that specific input string occurring. Further, in order to set occurrence probabilities of over 0.5, multiple code-words may be assigned to a single output value. As such, for a system with an unbiased, binary input string and two unbiased output values, only one decision is required and thus the occurrence probability of each output value being selected as the output is 0.5. However, if two output values, X and Y are required, for example, with an occurrence probability of 0.75 and 0.25 respectively, two decisions will be required and the code-words may be assigned, for example, as follows: X=1 and 01; Y=00. Using this method a wide range of output occurrence probabilities can be effectively obtained.

As stated above, the code-word set of FIG. 6 ensures that the output bias of $s'_1:s'_2:s'_3$ is 6:1:1 and the occurrence probabilities of $s'_1$, $s'_2$ and $s'_3$ are 0.75, 0.125 and 0.125 respectively. However, the occurrence frequencies can be set to practically any desired value in embodiments according to the present disclosure.

Figures 7, 8:
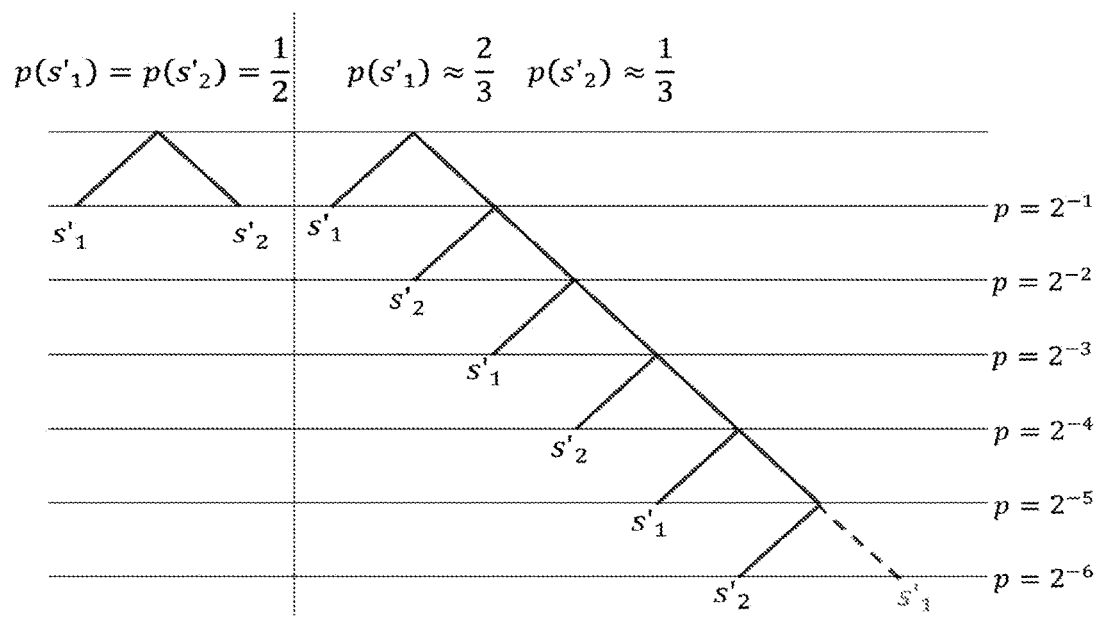
FIG. 7 illustrates a branch tree structure for a coding tree according to an embodiment.
FIG. 8 illustrates a branch tree structure for a coding tree according to an embodiment for creating binary biased output strings with bias 2:1.
Figure 9:
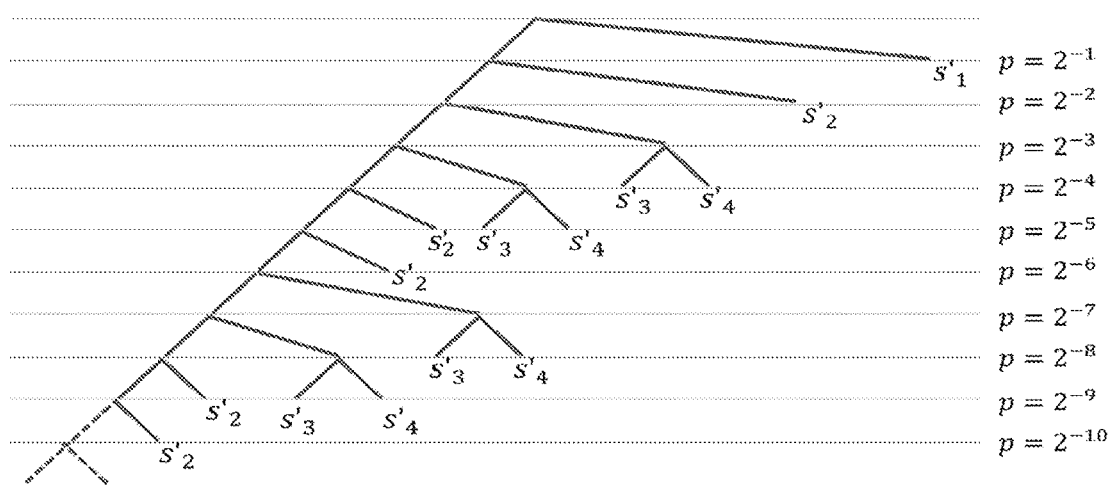
FIG. 9 illustrates a branch tree structure for a coding tree according to an embodiment for creating 4-symbol biased output strings with bias 5:3:1:1.

FIGS. 7 to 9 illustrate how, with an unbiased binary input string, the code-word set can be chosen to represent any desired bias. FIGS. 7 to 9 schematically show decision tree structures. Each junction in the structures of FIGS. 7 to 9 represents a decision which may be "$i_n=s_n$?" as in FIG. 6. The end of each line, where an output value is present, represents the step of setting the respective output to that specific value.

FIG. 8 illustrates that, given an unbiased binary input string (an assumption also maintained for FIGS. 9 and 10), a single decision (i.e. the identification of one input) leads to the output $o_n$ being set as one of two possible output values $s'_1$ and $s'_2$, each of these values having an occurrence probability of $p=2^{-1}$. This is because the probability of having a 0 or a 1 in the input of relevance, i.e. unbiased and binary string, is 0.5.

In this manner, the probability of there being either a 1 or 0 at every input location in the input string, when considered in isolation, is $2^{-1}$, or 0.5. As such, the probability of following either decision-path to move to the next level or decision is $2^{-1}$, or 0.5. The probability of reaching a specific input combination after two decisions is $2^{-2}$, and the probability of reaching a specific input combination after n decisions is $2^{-n}$. The horizontal lines of FIGS. 7 to 9 represent the probability of reaching a certain point (e.g. an input string matching a code-word for an output value) on the coding tree at that respective level.

This means that, in embodiments where an unbiased binary input is used, output probabilities of $2^{-n}$ and multiples thereof can be achieved exactly. For embodiments where output probabilities other than multiples of $2^{-n}$ are required, an approximation will be required. Correspondingly, if an unbiased input string of 3 values is used, output probabilities of $3^{-n}$ and multiples thereof can be achieved exactly; with an unbiased input string of 4 values, output probabilities of $4^{-n}$ and multiples thereof can be achieved exactly. This rule will apply to any number of possible input values.

Where the desired output probabilities cannot be represented exactly as discussed above, an approximation can be used instead. FIGS. 8 and 9 illustrate examples of such approximations.

FIG. 8 schematically illustrates a possible coding tree branch structure when two possible output values are required, $s'_1$ and $s'_2$, with respective output probabilities of about ⅔ and ⅓, respectively. The dashed line illustrates that in order to set the bias so as to achieve the desired output probabilities exactly, an infinite number of decisions and branches will be required. However, in order to be practicable, the actual branch structure can be truncated as illustrated in FIG. 8 by the dashed line with $s'_1$ at the end of it—although the more decisions are implemented the more accurate the approximation, in practice the coding tree would normally be truncated at a certain level for computational efficiency reasons.

The actual output probabilities $p(s'_1)$ and $p(s'_2)$ for the truncated branch structure of FIG. 8 are $2^{-1}+2^{-3}+2^{-5}+2^{-6}=0.671875$ and $2^{-2}+2^{-4}+2^{-6}=0.328125$. Despite the fact that only 6 decisions, or "levels" are used, this can be seen to be a very accurate approximation.

The consumption, C, for the branch structure of FIG. 8, assuming the outputs $s'_1$ and $s'_2$ are single symbol outputs, is:

$$C=1\times\tfrac{1}{2}+2\times\tfrac{1}{4}+3\times\tfrac{1}{8}+4\times\tfrac{1}{16}+5\times\tfrac{1}{32}+2\times6\times\tfrac{1}{64}\approx1.97$$

meaning that less than 2 bits from the initial string are necessary to achieve the desired output distribution.

FIG. 9 illustrates a further branch structure where the output values $s'_1$, $s'_2$, $s'_3$ and $s'_4$ are desired with output probabilities $p(s'_1)\approx0.5$, $p(s'_2)\approx0.3$ and $p(s'_3)=p(s'_4)\approx0.1$. The actual probabilities of the branch structure shown are: $p(s'_1)=0.5$, $p(s'_2)\approx0.2998$ and $p(s'_3)=p(s'_4)\approx0.09961$. These values are very close to the desired values.

These values do not add up to 1 as a the lowermost branch (dashed) is left open, this branch may continue with further decision levels to further increase the accuracy of the output probabilities.

The implementation of FIG. 9 may use 10 nested "IF" conditions. This roughly corresponds to the depth of a memory unit in hardware implementation.

Figure 10:
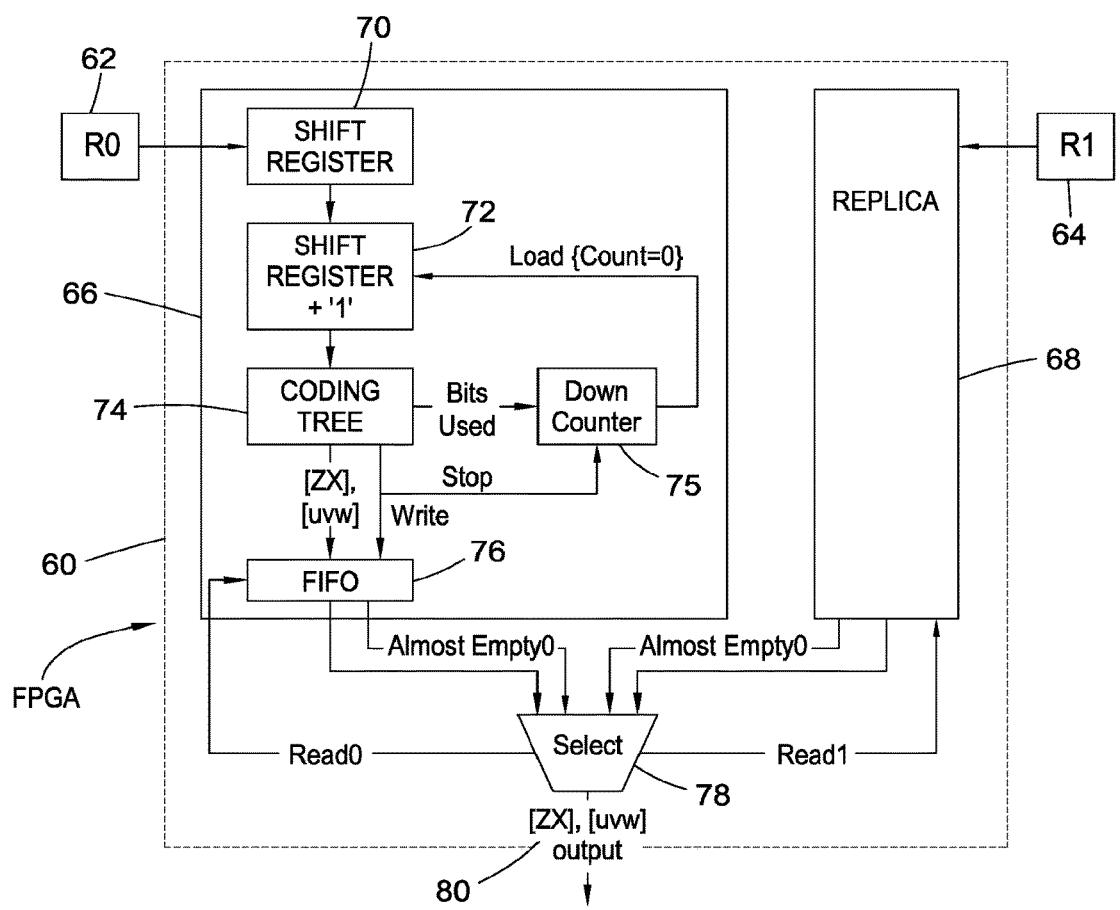
FIG. 10 schematically illustrates an embedded Field-programmable gate array (FPGA) according to an embodiment.

FIG. 10 is a schematic of a field-programmable gate array (FPGA) 60 according to an embodiment. The architecture of the embodiment of FIG. 10 utilises two input strings, delivered by two string generators or two Q-RNGs as discussed above, called R0 62 and R1 64. These two input strings are input to two similar modules 66 and 68. Each of the functional modules 66 and 68 comprises a standard shift register 70 and 72 by means of which the input strings 62 and 64 are entered into a coding tree 74. The coding tree 74 may be based on a Huffman coding tree as illustrated in the embodiment of FIG. 6, or a coding tree of an alternative embodiment.

A down counter 75 is operably linked to the coding tree 74 and shift register 70 and 72. The down counter 75 sets how many inputs or input variables were used from the respective input string to determine the current output or output value. The system then waits for that number of new symbols to be shifted. This is implemented by the down counter 75 and shift register 70 and 72. This can be implemented by counting down to zero, or some other pre-set value. This ensures that the input or input values used to determine an output or output value are not reused to determine a second output or output value.

A FIFO memory unit is used in the embodiment of FIG. 10 to store the output data in the first module 66, before it is merged with data from the similar second module 68 in the Select unit 78. The Select unit 78 then outputs the final output string 80, which will be a combination of the outputs of R0 62 and R1 64.

The "Almost Empty" indicates when there are less than N symbols stored in the output FIFO. N will normally be a small value greater than 0. The output control uses the Almost Empty from the two modules to decide from which side to read. Once the output control has used the Almost Empty to decide from which side to read, the Read0/Read1 pulls the relevant output value out of the relevant FIFO memory.

The Almost Empty is required to avoid a read at empty with respect to the FIFO (underflow). It takes a finite time (i.e. number of clock cycles) from a read operation to update the condition flags of the FIFO. N can be determined by the latency of the round trip of read to almost empty update (for most FPGA/ASIC N would be less than 4 and if the FPGA/ASIC combinatorial speed is fast and the clock used slow it could be 0). However, the depth of the FIFO can be chosen large enough so to avoid underflow by preventively loading enough data into it.

An alternative embodiment may implement the above in a single module. Such an embodiment may set the input clock at twice the output clock rate, assuming the output symbol rate is larger than half the value of the input rate. This way, the input and output throughput will be matched.

Figure 11:
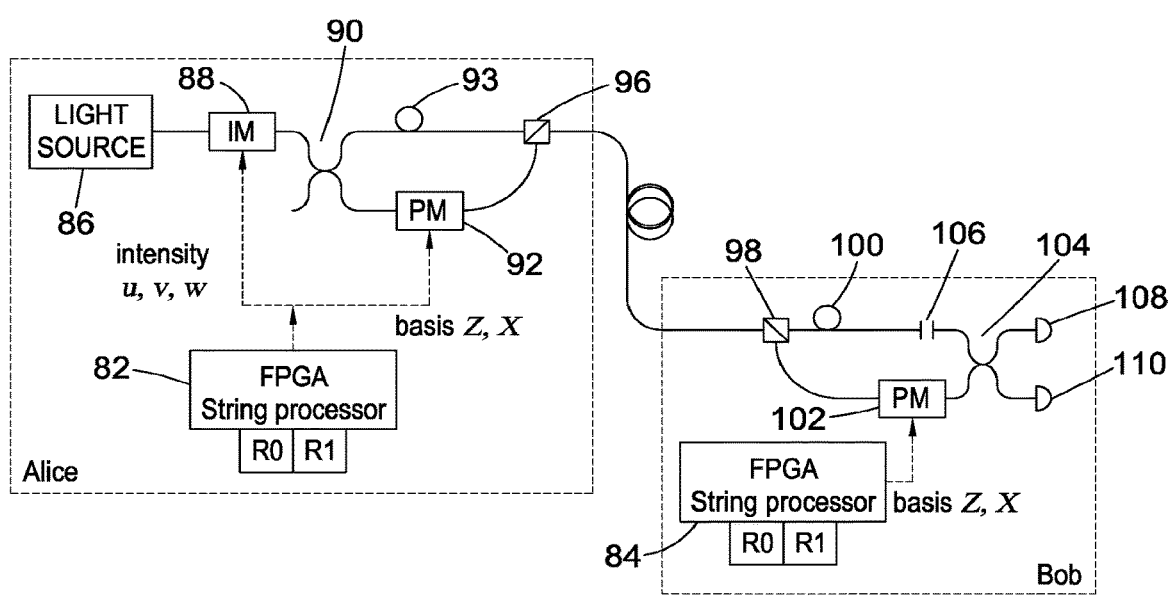
FIG. 11 schematically illustrates a FPGA according to an embodiment implemented in a QKD system.

FIG. 11 shows two FPGA string processors 82 and 84 according to an embodiment implemented in a QKD system. Two FPGAs according to embodiments described herein are implemented in a QKD system in FIG. 11. Alternatively, one, three or more than three FPGAs according to embodiments may be implemented in a QKD system such as that of FIG. 11.

In FIG. 11, a QKD setup to implement the standard or the efficient version of the decoy-state BB84 protocol is depicted. The embodiment of FIG. 11 illustrates a sender, Alice, sending an encrypted key to a receiver, Bob. A light source 86, or photon source, generates a light pulse which is then passed through an intensity modulator 88. The intensity modulator 88 implements the decoy-state method, wherein each light pulse or photon is randomly modulated to one of a number of predetermined intensities $\{u, v, w\}$, corresponding to "signal", "decoy" or "vacuum", respectively; and these predetermined intensities occur with an occurrence frequency determined by the user $\{f_u, f_v, f_w\}$. A string processor, or FPGA string processor 82 according to an embodiment is used to control the intensity modulator 88, providing three outputs (each corresponding to a certain intensity) with a quality-assured level of randomness and with a predetermined bias.

The intensity-modulated pulses are then split by an input beam splitter 90. One path—the "first path"—goes through a phase modulator 92 after the beam splitter 90. The phase modulator 92 randomly modulates the photons by a specific phase, thus outputting the photons with one of (in this embodiment) two bases $\{Z, X\}$. The occurrence ratio between the two bases may be biased or unbiased, and predetermined by a user. In the former case, the efficient version of the BB84 protocol is realized; in the latter case, the standard version of the BB84 protocol is realized. The invention disclosed herein can cover both cases, with the unbiased case as a trivial particular case. A string processor, or FPGA string processor 82 according to an embodiment is used to control the phase modulator 92 for the basis selection. The FPGA 82 controlling the basis selection in the phase modulator 92 of FIG. 11 is equivalent to the FPGA 82 that controls the intensity modulator 88. Alternatively, a different string processor or FPGA according to an embodiment may be used to control the phase modulator 92.

The second path from the input beam splitter 90 is sent through an optical delay 93.

Light pulses or photons from the first and second path are then sent to the receiver, Bob, via an optical transmission line 94 and two polarising beam splitters 96 and 98. Alice's polarising beam splitter 96 rotates and combines polarised pulses or photons from the two different paths and send them through the optical transmission line 94. As the pulses or photons are polarised, Bob's polarising beam splitter 98 separates them and directs them onto the two paths of his interferometer, this time sending the pulses or photons sent through Alice's phase modulator 92 through an optical delay 100 and the pulses or photons not sent through Alice's phase modulator 92 through phase modulator 102. This way, the pulses or photons can reach the final beam splitter 104 at the same time and can interfere.

Bob's phase modulator 102 randomly selects one of two bases in which to measure the received pulses or photons, by selecting a phase modulation value. Similar to Alice's phase modulator 92, Bob's phase modulator 102 randomly modulates the photons by a specific phase, thus effectively measuring through the detectors 108 and 110 the photons with one of (in this embodiment) two bases $\{Z, X\}$. The occurrence ratio between the two bases is biased, and predetermined by a user to be equal to that of Alice's phase modulator 92. A further string processor or FPGA string processor 84 according to an embodiment may be used to control this second phase modulator 102 for the basis selection.

The two paths in the receiver are then again combined at the output beam splitter 104. To ensure the two optical delays 93 and 100 combine to ensure that both overall paths experience the same delay, a variable delay line 106 fine tunes the delay in the receiver.

Photon detectors 108 and 110 are then used to measure the result of the interference between the pulses or photons on the two paths; and from these results the key may be derived. For example, the key bit value 0 can be assigned if detector 108 clicks while the key bit value 1 can be assigned if detector 110 clicks.

Figure 12:
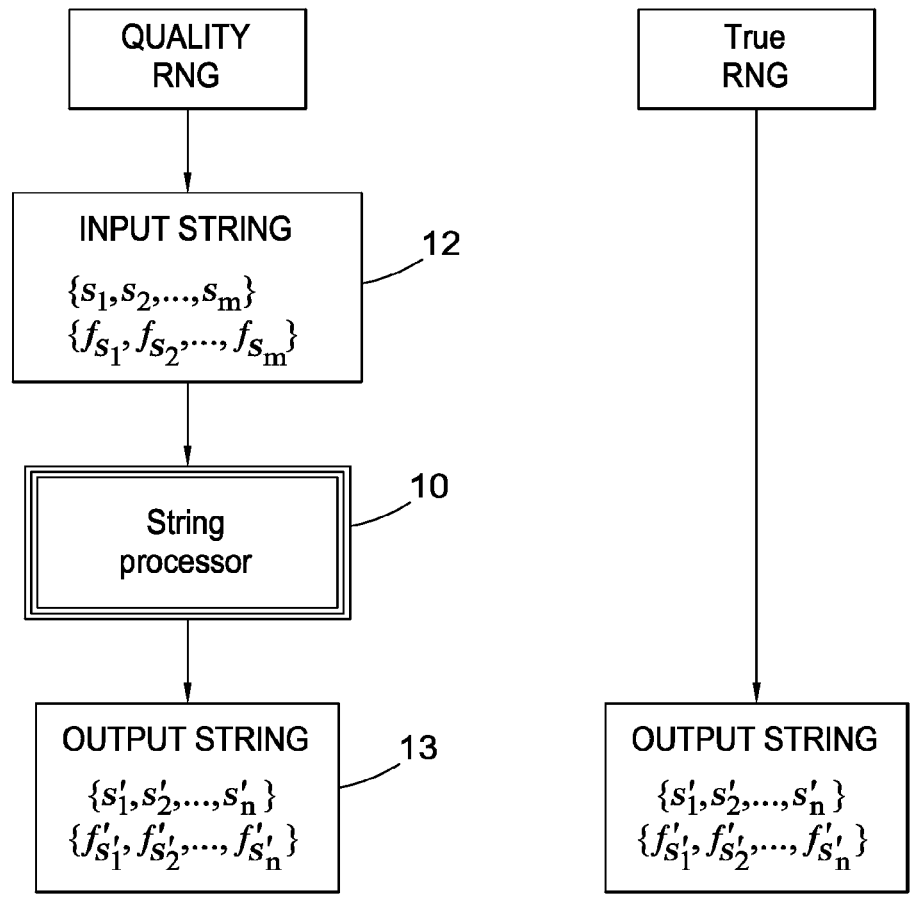
FIG. 12 schematically illustrates an embodiment described herein and a biased True-RNG.

FIG. 12 is a schematic illustration of how a string processor 10 according to an embodiment described herein, given an input string 12 of unbiased values of which the quality is proven, can output a string 13 of different, biased values $\{s'_1, s'_2, \ldots, s'_n\}$ with the output frequencies $\{f_{s'1}, f_{s'2}, \ldots, f_{s'n}\}$; and how such a string processor 10 can be compared to a biased True RNG 15 outputting an output string of values $\{s'_1, s'_2, \ldots, s'_n\}$ with the output frequencies $\{f_{s'1}, f_{s'2}, \ldots, f_{s'n}\}$.

Figure 13A:
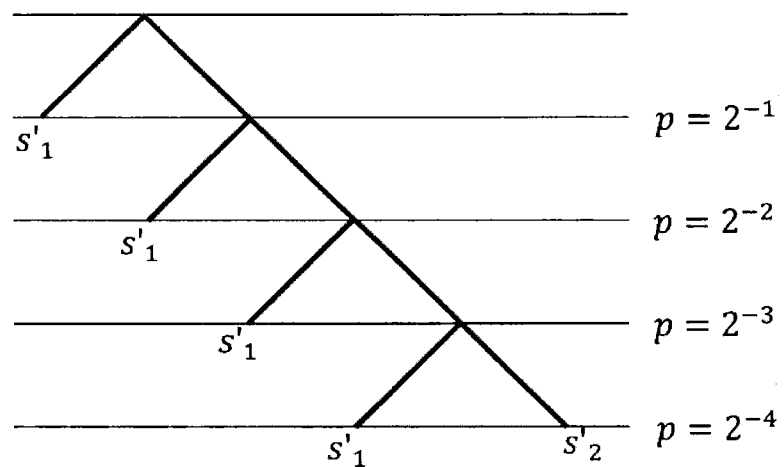
FIG. 13A illustrates a branch tree structure for a coding tree according an embodiment.

FIG. 13A illustrates a decision tree structure where the outputs, $s'_1$ and $s'_2$ have output probabilities $p(s'_1)=15/16$ and $p(s'_2)=1/16$. As explained above, these probabilities can be represented exactly in a coding tree format as disclosed herein for a binary input, as illustrated in FIG. 13A. For an unbiased random binary input, the output values $s'_1$ and $s'_2$ can have the code-word set $s'_1=0$, 10, 110 and 1110; and $s'_2=1111$.

Figure 13B:
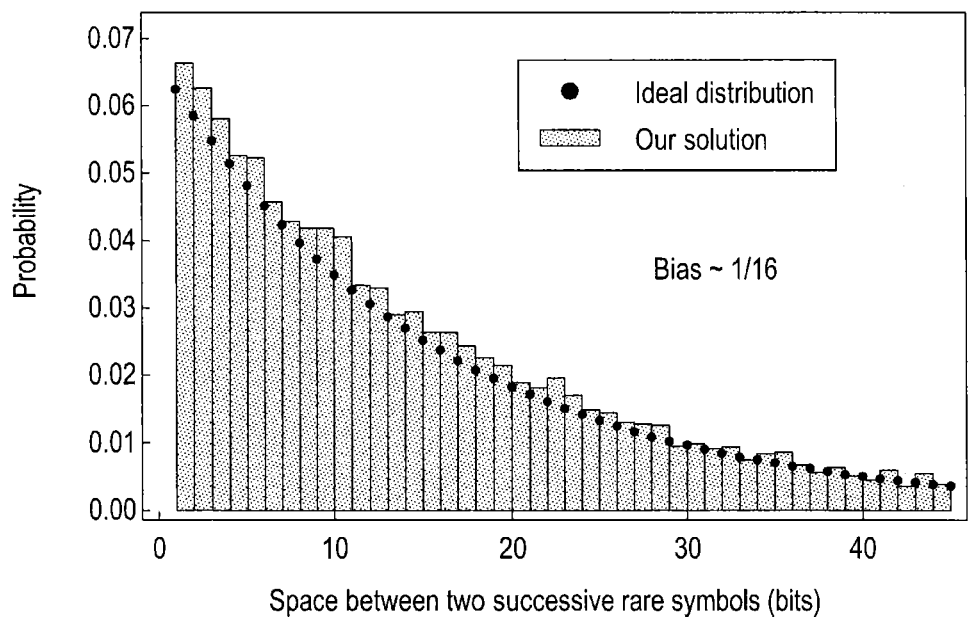
FIG. 13B shows a plot of the achieved occurrence frequency compared to the ideal distribution for an embodiment according to FIG. 13A.

FIG. 13B shows a plot of the occurrence frequency of an embodiment according to FIG. 13A achieved using the coding tree, compared to the ideal distribution representing the predicted mathematical distribution obtained by a computer program. The probability is plotted against the space between two "rare" bits, where the bias of the system is 1/16. As it can be seen, there is a very good correspondence between the two data sets.

Figure 14:
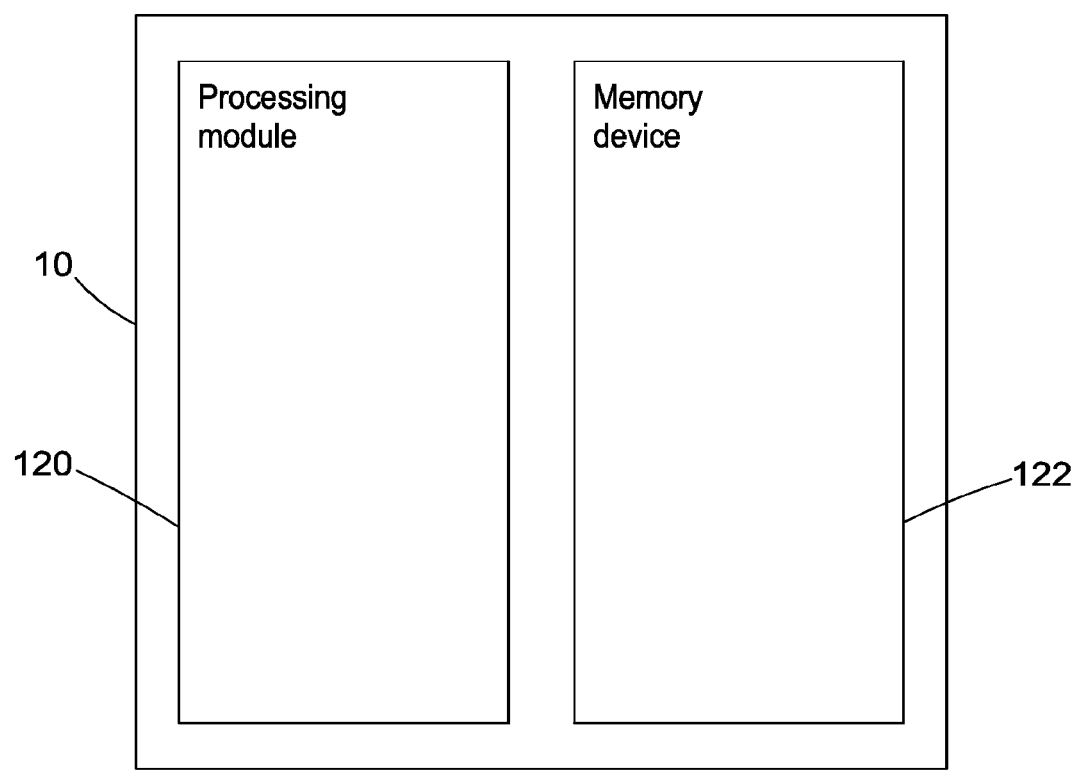
FIG. 14 schematically illustrates a string processor according to an embodiment.

FIG. 14 illustrates a string processor 10 according to an embodiment. The string processor 10 comprises a processing unit 120 and memory device 122.

As outlined near the start of this document, in order for a string of unbiased, random bits to be suitable for use in a variety of applications, the string requires the following properties:

(a) the string of bits must meet a certain assessable level of quality of randomness;
(b) the string of bits must be statistically indistinguishable from a comparable (e.g. same value/bit rate and bias) string of values or bits generated by a TRNG; and (c) the occurrence frequency (i.e. the bias) of the bits in the output must approximate that selected by a user.

Furthermore, an additional efficiency optimisation requirement can also be taken into consideration:

(d) the generation of each bit in the output string must use on average a number of bits from the input string which is close to the entropy of the output string.

Reviewing the three requirements and optimisation requirement for a string of values or bits according to an embodiment, the following observations can be made:

(a) a string processor according to an embodiment is based on an input string of unbiased, random variables. This input string can be subjected to a quality assessment, as discussed above. The subsequent method of the embodiment does not affect the randomness of the input string and, as such, the output string of biased, random variables has a quality equal to that of the input string;

(b) the statistical distribution of the output of an embodiment is close to the mathematical ideal. An example is illustrated in FIG. 13B. The closeness between the two distributions can be quantified exactly using the variational distance or other standards statistical distances;

(c) as discussed above in relation to FIGS. 6 to 9, the occurrence probability can be set to any desired probability, within a certain degree of accuracy; and (d) the efficiency of embodiments achieved by using a coding tree format is optimal. Specifically, the efficiency is always within 2 bits the entropy of the output string.

The specific embodiments are presented schematically. The reader will appreciate that the detailed implementation of each embodiment can be achieved in a number of ways. For instance, a dedicated hardware implementation could be designed and built. On the other hand, a processor could be configured with a computer program, such as delivered either by way of a storage medium (e.g. a magnetic, optical or solid state memory based device) or by way of a computer receivable signal (e.g. a download of a full program or a "patch" update to an existing program) to implement the string processor described above in relation to the embodiments. Besides these two positions, a multi-function hardware device, such as a DSP, a FPGA or the like, could be configured by configuration instructions.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

The invention claimed is:

1. A sending unit for a quantum communications system, the sending unit comprising:
a string processor;
a quantum bit source comprising logic configured to generate a plurality of quantum bits for sending to a receiving unit;
an intensity modulator comprising logic arranged to modulate an intensity of a portion of the quantum bits; and
a phase modulator comprising logic arranged to modulate a phase of a portion of the quantum bits, wherein
the intensity modulator and the phase modulator are configured to receive a biased output string from the string processor configured to output the biased output string comprising a first output value and a second output value given an unbiased input string of at least two input values,
the string processor comprises a processing unit and a memory device,
the memory device stores a code-word set, the code-word set comprising a plurality of code-words and each code-word comprising at least one input value,
each output value has at least one corresponding code-word,
the processing unit comprises logic configured to:
compare a comparison string to the code-words, the comparison string comprising an input from the input string; and
assign an output value to the output string when the comparison string matches a code-word, the assigned output value being that to which the matched code-word corresponds,
an output probability of an output value is defined by a number and length of the code-words corresponding to that output value,
the output probability of the first output value is larger than the output probability of the second output value, and
the processing unit comprises logic further configured to, when the comparison string does not match a code-word:
read a next available input in the input string; and
add the next available input to the comparison string, an available input being an input that is not part of the comparison string.

2. The sending unit for a quantum communications system according to claim 1, wherein
the string processor includes a field programmable gate array, and
the intensity modulator and phase modulator receive the biased output string from the field-programmable gate array.

3. The sending unit according to claim 1, wherein the processing unit is configured to discard the comparison string when the comparison string matches a code-word in the code-word set.

4. The sending unit according to claim 1, wherein the processing unit is configured to allow a user to define the code-word set.

5. The sending unit according to claim 1, wherein the processing unit is configured to implement the compare operation using a Huffman coding tree structure.

6. The sending unit according to claim 1, wherein the unbiased input string is a quality assessed random binary input string.

7. A receiving unit for a quantum communications system, the receiving unit comprising:
a string processor;
at least one detector comprising logic for detecting received quantum bits; and
a phase modulator comprising logic arranged to modulate a phase of a portion of the received quantum bits for measurement, wherein
wherein the phase modulator receives a biased output string from the string processor configured to output the biased output string comprising a first output value and a second output value given an unbiased input string of at least two input values, the string processor comprises a processing unit and a memory device, the memory device stores a code-word set, the code-word set comprising a plurality of code-words and each code-word comprising at least one input value, each output value has at least one corresponding code-word, the processing unit comprises logic configured to:
- compare a comparison string to the code-words, the comparison string comprising an input from the input string; and
- assign an output value to the output string when the comparison string matches a code-word, the assigned output value being that to which the matched code-word corresponds, an output probability of an output value is defined by a number and length of the code-words corresponding to that output value, the output probability of the first output value is larger than the output probability of the second output value, and the processing unit comprises logic further configured to, when the comparison string does not match a code-word:
- read a next available input in the input string; and
- add the next available input to the comparison string, an available input being an input that is not part of the comparison string.

8. The receiving unit for a quantum communications system according to claim 7, wherein
the string processor includes a field programmable gate array, and
the phase modulator receives the biased output string from the field-programmable gate array.

9. The receiving unit according to claim 7, wherein the processing unit is configured to discard the comparison string when the comparison string matches a code-word in the code-word set.

10. The receiving unit according to claim 7, wherein the processing unit is configured to allow a user to define the code-word set.

11. The receiving unit according to claim 7, wherein the processing unit is configured to implement the compare operation using a Huffman coding tree structure.

12. The receiving unit according to claim 7, wherein the unbiased input string is a quality assessed random binary input string.

13. A quantum communication system comprising:
a string processor;
a sending unit comprising:
- a quantum bit source comprising logic configured to generate a plurality of quantum bits for sending to a receiving unit;
- an intensity modulator comprising logic arranged to modulate an intensity of a portion of the quantum bits; and
- a phase modulator comprising logic arranged to modulate a phase of a portion of the quantum bits, and a receiving unit comprising:
- at least one detector comprising logic for detecting received quantum bits; and
- a phase modulator comprising logic arranged to modulate a phase of a portion of the received quantum bits for measurement, wherein at least one of the intensity modulator and the phase modulator in the sending unit and the phase modulator in the receiving unit receives a biased output string from the string processor configured to output the biased output string comprising a first output value and a second output value given an unbiased input string of at least two input values, the string processor comprises a processing unit and a memory device, the memory device stores a code-word set, the code-word set comprising a plurality of code-words and each code-word comprising at least one input value, each output value has at least one corresponding code-word, the processing unit comprises logic configured to:
- compare a comparison string to the code-words, the comparison string comprising an input from the input string; and
- assign an output value to the output string when the comparison string matches a code-word, the assigned output value being that to which the matched code-word corresponds, an output probability of an output value is defined by a number and length of the code-words corresponding to that output value, the output probability of the first output value is larger than the output probability of the second output value, and the processing unit comprises logic further configured to, when the comparison string does not match a code-word:
- read a next available input in the input string; and
- add the next available input to the comparison string, an available input being an input that is not part of the comparison string.

14. The quantum communication system according to claim 13, wherein
the string processor includes a field programmable gate array, and
the at least one of the intensity modulator and phase modulator in the sending unit and the phase modulator in the receiving unit receives the biased output string from the field-programmable gate array.

* * * * *